J. TURNER.
Glue Pot.
No. 26,957.  Patented Jan'y 24, 1860.
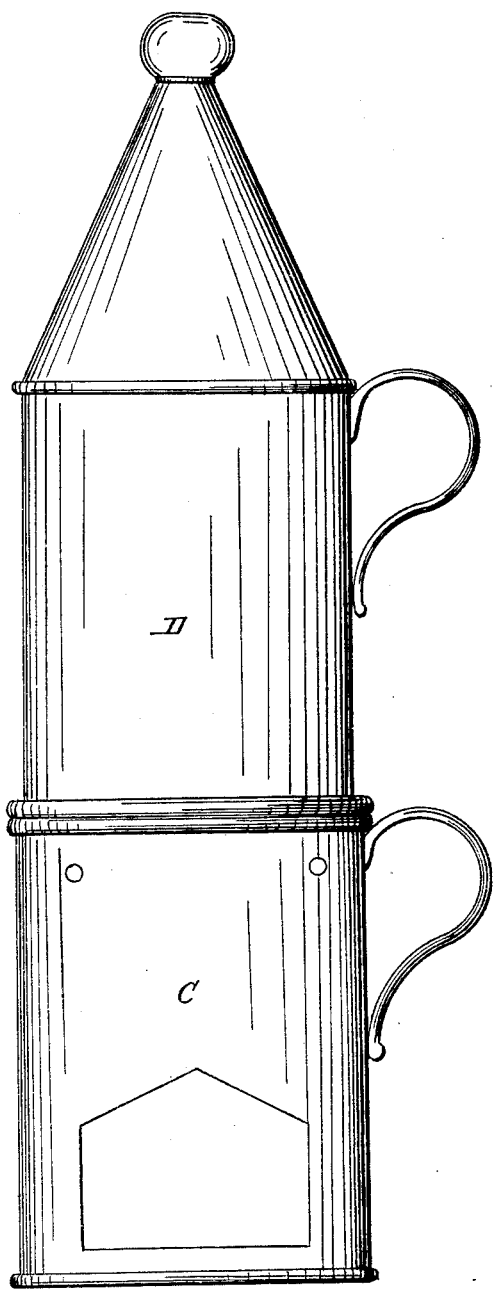
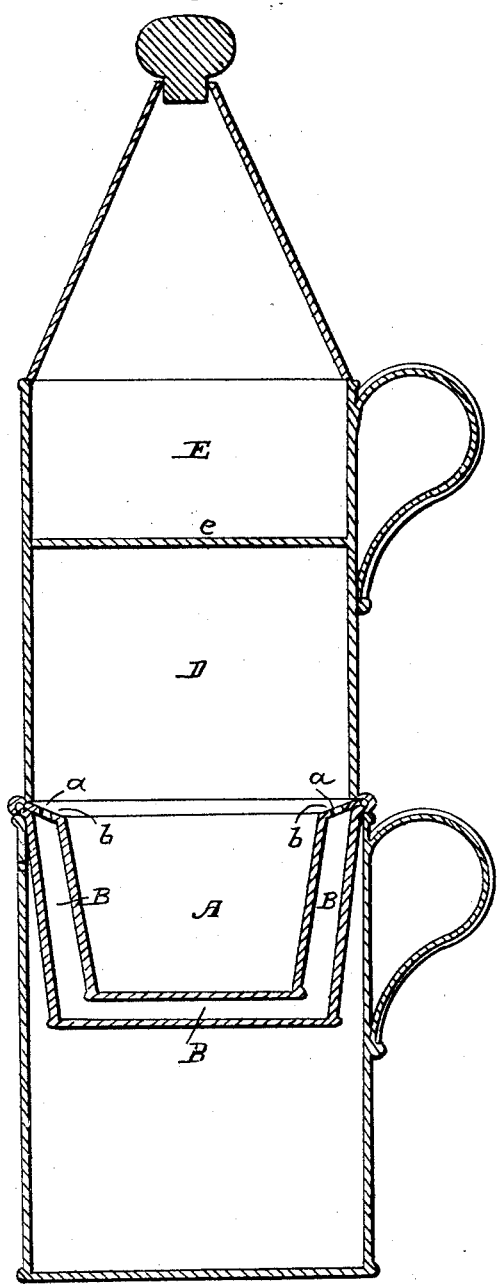
Witnesses:
Edw. C. Putnam
J. S. Bartlett
Inventor:
Joshua Turner

UNITED STATES PATENT OFFICE.

JOSHUA TURNER, OF CAMBRIDGEPORT, MASSACHUSETTS, ASSIGNOR TO HIMSELF, J. T. BARTLETT, AND E. E. BUTMAN, OF BOSTON, MASSACHUSETTS.

GLUE-POT.

Specification of Letters Patent No. 26,957, dated January 24, 1860.

*To all whom it may concern:*

Be it known that I, JOSHUA TURNER, of Cambridgeport, in the county of Middlesex and State of Massachusetts, have invented an Improved Glue Pot or Apparatus for Liquefying Glue; and I do hereby declare the same to be fully described and represented in the following specification and the accompanying drawings, of which—

Figure 1, is a side elevation, and Fig. 2, a vertical section of it.

The common glue pot, used by joiners and cabinet ware manufacturers consists of a vessel for holding water and one for containing the glue, the latter vessel being so placed within the former as to have the liquid contents thereof surrounding its sides. These vessels so arranged together have been inserted in a case like that of a "nurse lamp," such case being furnished with a lamp or means of heating the water vessel. The difficulty attendant on a glue pot so constructed, (although a cover may be used on the inner vessel) is, that water, when placed in such vessel with glue and heated soon evaporates so as to cause the solution of glue to grow thicker continually whereas, it is often very desirable to maintain uniformity in the proportions of the water and glue.

In carrying out my invention, I make use, of the glue and water holder or vessel A, and a water vessel B, to receive the said vessel A, and a body of liquid to extend about its sides. The outer one of these vessels may be supported by a case C, for holding a lamp or means of heating the external surface or the bottom of the water vessel. Over the two vessels A, and B, I arrange a cylindrical or other proper shaped deep cover or vessel D, made so as to serve the purposes of a steam receiver, condenser and brush cover. The vessel D, should cover both the vessels A, and B, and there should be one or more passages or openings *a*, made between the vessels A, B, or through the rim *b*, of the vessel A, so as to permit steam or vapor from the vessel B, to pass up into the cover or cap vessel D, and come in contact with the upper surface of the solution of glue when in the vessel A. Furthermore, above the vessel or cap D, there may be another or sponge receiver E, so applied as to have its bottom *e*, constitute the top of the vessel D. The object of the receiver E, is to hold water and a sponge and to heat the same, as almost every workman while using glue finds it necessary or very convenient to have a sponge and a vessel of hot water in order to wipe off, and cleanse from any article, the surplus of the glue he may apply thereto.

With my improved glue pot, the steam from the water vessel, which in others is allowed to escape into the atmosphere is made to pass into the cover or cap D, and operates not only to heat the contents of the vessel A, but to supply the same with condensed water sufficient to compensate for the water, lost by evaporation of the water in such vessel while the cover may be off the two vessels A, and B. When a glue brush is not in use, it is customary for a workman to leave it in the glue. In order that he may do so, the cover or cap, D, should be made high enough to receive the handle of the brush under such circumstances. Furthermore, the cover or condenser D, performs another valuable function as by reason of the condensation of the steam, water will run down the inner surface of the vessel and upon the top surface of the rim *b*, and so as to wash off the same any glue that may attach or be left thereon by the workman while pressing his brush against the rim and for the purpose of expressing from the said brush any surplus of the solution of glue.

I claim as my invention,

1. The improved article of manufacture, or glue pot constructed not only with one or more steam escape passages *a*, leading out of the space between the glue holder A, and the water vessel B, but with a steam retainer and condenser D, applied to cover both vessels A, and B, and operate therewith substantially as specified.

2. And in combination therewith, or with a glue pot made with the vessels A, B, and cover or condenser D, arranged and connected by one or more passages *a*, as described, I claim the sponge receiver or water and sponge heater E, arranged therewith substantially as specified.

JOSHUA TURNER.

Witnesses:
R. H. EDDY,
F. R. HALE, Jr.